United States Patent [19]

Yokoyama et al.

[11] Patent Number: 4,915,861
[45] Date of Patent: Apr. 10, 1990

[54] LIQUID ELECTROLYTE FOR USE IN ELECTROLYTIC CAPACITOR

[75] Inventors: Yutaka Yokoyama; Makoto Shimizu; Tatsunori Tsuji, all of Tokyo, Japan

[73] Assignee: Nippon Chemi-Con Corporation, Tokyo, Japan

[21] Appl. No.: 282,650

[22] Filed: Dec. 12, 1988

Related U.S. Application Data

[63] Continuation of Ser. No. 169,245, Mar. 16, 1988, abandoned.

[30] Foreign Application Priority Data

Mar. 16, 1987 [JP] Japan .................... 62-60740

[51] Int. Cl.$^4$ ............................................. H01G 9/02
[52] U.S. Cl. .................................... 252/62.2; 361/505
[58] Field of Search ................... 252/62.2; 361/433 E

[56] References Cited

U.S. PATENT DOCUMENTS

| 4,377,692 | 3/1983 | Barry et al. | 252/62.2 |
| 4,473,864 | 9/1984 | Van Heusden | 252/579 |
| 4,715,976 | 12/1987 | Mori et al. | 252/62.2 |
| 4,734,821 | 3/1988 | Morimoto et al. | 252/62.2 |

FOREIGN PATENT DOCUMENTS

36-000033 11/1961 Japan .

*Primary Examiner*—John F. Niebling
*Assistant Examiner*—Kathryn Gorgos
*Attorney, Agent, or Firm*—Sughrue, Mion, Zinn, Macpeak & Seas

[57] ABSTRACT

A liquid electrolyte is disclosed, which contains as an electrolyte a dicarboxylic acid salt of tetramethylammonium in an aprotic polar solvent, with the molar ratio of cations to anions in the electrolyte being adjusted to be within the range of from 1:1.05 to 1:1.75.

4 Claims, 4 Drawing Sheets

LIQUID ELECTROLYTE FOR USE IN ELECTROLYTIC CAPACITOR

This is a continuation of application Ser. No. 169,245, filed on Mar. 16, 1988, now abandoned.

FIELD OF THE INVENTION

The present invention relates to an improvement of a liquid electrolyte for use in an electrolytic capacitor.

BACKGROUND OF THE INVENTION

Electrolytic capacitors comprise an anode, which is made of a valve metal such as aluminum, tantalum or niobium and on the surface of which a dielectric or insulating oxide film layer is formed by anodization or some other means, and a cathode which faces the anode via a separator impregnated with a liquid electrolyte. The liquid electrolyte is in contact with the essentially dielectric oxide film layer and serves as the true cathode. Therefore, the characteristics such as the specific resistance of the liquid electrolyte have direct effects on the electrical characteristics of the electrolytic capacitor, and it is indispensable to employ a liquid electrolyte having good characteristics for the purpose of fabricating an electrolytic capacitor of high performance.

With a view to making liquid electrolytes having good characteristics, the use of tetraalkylammonium salts of dicarboxylic acids dissolved in aprotic polar solvents has recently been reviewed. Tetramethylammonium salts of dicarboxylic acids have drawn researchers' attention as electrolytes having low specific-resistance characteristics, and these salts are easier to synthesize than other tetraalkylammonium salts. However, because of their low solubility in aprotic polar solvents, the liquid electrolyte systems using the tetramethylammonium salts of dicarboxylic acids cannot be rendered satisfactorily low in specific resistance and are unable to ensure good characteristics at low temperatures. These problems have prevented the salts from exhibiting their inherent characteristics as electrolytes to the fullest extent.

A prior art proposal for using tetramethylammonium salts of dicarboxylic acids as electrolytes is shown in Unexamined Published Japanese Patent Application No. 78522/1984. In this prior patent, the specific resistance is reduced (electroconductivity improved) and the efficiency of electrochemical conversion is improved by both adding a small amount of water to aprotic polar solvents and introducing more cations in the electrolyte than anions in terms of equivalent ratio. However, the presence of water causes pressure buildup in the interior of the electrolyte capacitor when it is used at temperatures in excess of 100° C., and this can lead to a shorter life of the capacitor. The use of water can also result in deterioration of the capacitor's characteristics at low temperatures.

SUMMARY OF THE INVENTION

The present inventors found that the solubilities of tetramethylammonium salts of dicarboxylic acids in aprotic solvents were increased if the molar ratio of anions to cations in the salts was within a certain range, especially on the anion-rich side. On the basis of this finding, the present inventors continued their studies in an attempt to produce a liquid electrolyte that is nonaqueous, low in specific resistance and which yet has good temperature characteristics.

This object of the present invention can be attained by a liquid electrolyte that contains as an electrolyte a dicarboxylic acid salt of tetramethylammonium in an aprotic polar solvent, with the molar ratio of cations to anions in the electrolyte being adjusted preferably to be within the range of from 1:1.05 to 1:1.75, and more preferably from 1:1.05 to 1:1.40.

The liquid electrolyte has an increased solubility in an aprotic polar solvent because the molar ratio of cations to anions in the tetramethylammonium salt of a dicarboxylic acid serving as the electrolyte is adjusted to be within the anion-rich range specified above. This contributes not only to a reduction in the specific resistance of the liquid electrolyte but also to an improvement of its temperature characteristics, notably the characteristics in the low temperature range.

DETAILED DESCRIPTION OF THE INVENTION

Examples of the electrolyte that can be employed in the present invention include but are not limited to tetramethylammonium salts of dicarboxylic acids such as oxalic acid, malonic acid, succinic acid, glutaric acid, adipic acid, pimelic acid, suberic acid, axelaic acid, sebacic acid, maleic acid, fumaric acid, methylmaleic acid and phthalic acid. These electrolytes may be used either on their own or as admixtures.

The solute is added preferably in an amount of from 5 wt% to an amount sufficient to show a saturated solubility, and more preferably from 10 wt% to 30 wt% based on the liquid electrolyte.

Into the liquid electrolyte of the present invention, various kinds of additives may be incorporated to improve the characteristics of the liquid electrolyte. For instance, phosphoric acid or phosphoric acid compounds prevent hydration of an oxidized film to stabilize characteristics of an electrolytic capacitor as is disclosed in Japanese Patent Publication 33/61, Nitro compounds such as nitrophenol, etc. prevent a generation of hydrogen gas to prevent a rise of the pressure in the capacitor as is disclosed in unexamined published Japanese Patent Application 93443/79. Further, resorcyclic acid is used to lower an amount of a leaked electric current, and proton solvent.

The anion-to-cation molar ratio is generally adjusted using tetramethylammonium hydroxide and dicarboxylic acid each being dissolved in an appropriate solvent.

The following examples are provided for the purpose of further illustrating the present invention but are not to be taken as limiting.

EXAMPLES

Three different electrolytes, tetramethylammonium phthalate, tetramethylammonium maleate and tetramethylammonium succinate each was dissolved in N,N-dimethylformamide to prepare a liquid electrolyte. As to the liquid electrolyte thus obtained, the change in the solubilities and the specific resistance were measured.

First, the changes in the solubilities of various electrolytes in aprotic polar solvents and those in the specific resistances of the resulting liquid electrolytes were investigated as a function of the molar ratio of anions to cations in the electrolytes.

Figure 1:
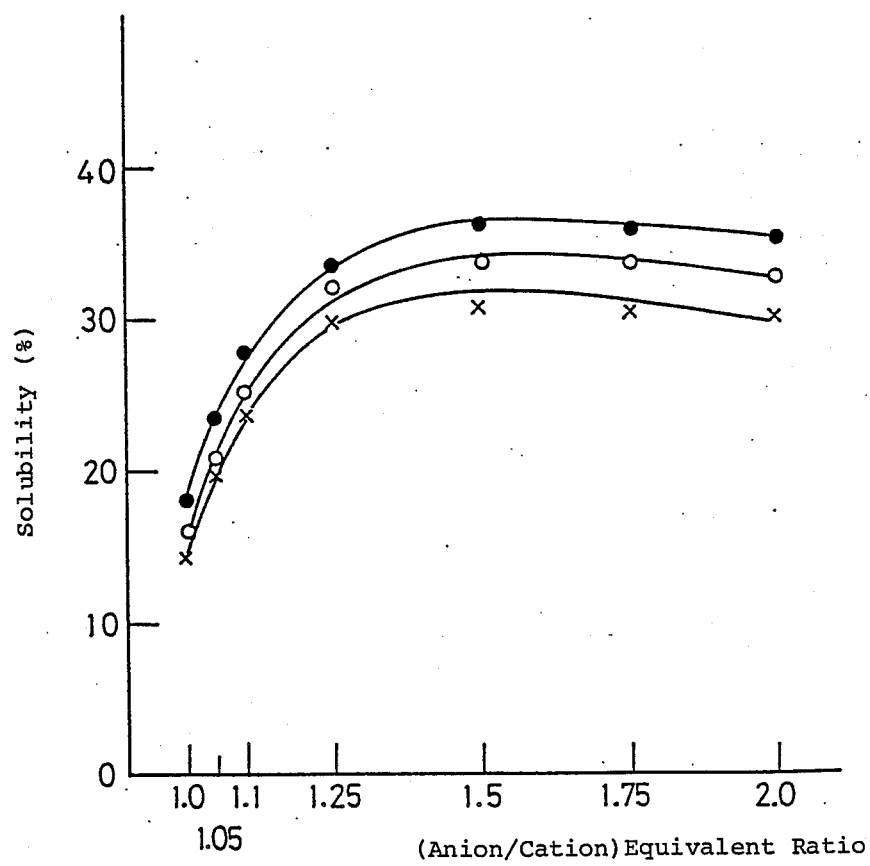
FIG. 1 is a graph showing the solubilities of various electrolytes in N,N-dimethylformamide as a function of the anion-to-cation molar ratio of the electrolytes.
Figure 2:
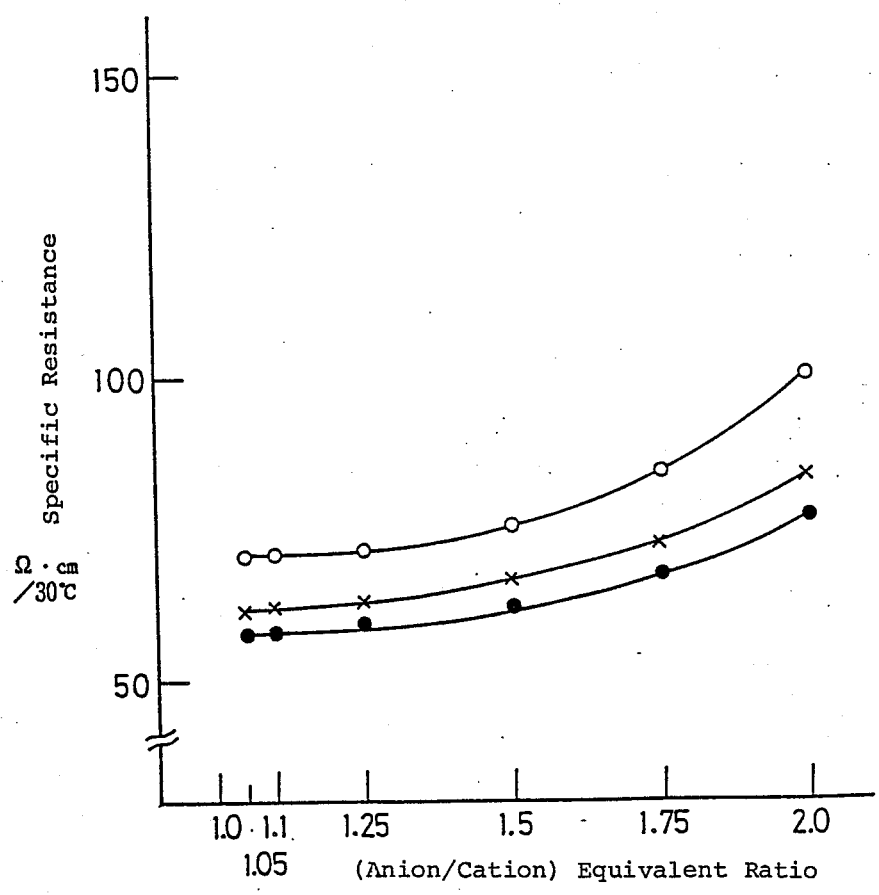
FIG. 2 is a graph showing the specific resistances of various electrolytes in N,N-dimethylformamide as a function of the anion-to-cation molar ratio of the electrolytes.

FIGS. 1 and 2 depict the results of investigations conducted on liquid electrolytes having three different electrolytes, tetramethylammonium phthalate (◯), teramethylammonium maleate (□) and tetramethylammonium succinate (Δ), dissolved in N,N-dimethylformamide (parenthesized symbols are keyed to the symbols used in the graphs). FIG. 1 shows the solubility of each electrolyte in N,N-dimethylformamide as a function of its anion-to-cation molar ratio. FIG. 2 is a similar graph for the change in the specific resistance of each liquid electrolyte system, except that each of the electrolytes tested was dissolved in the solvent at a concentration of 20 wt%.

The same investigation was conducted with γ-butyrolactone being used as a solvent for tetramethylammonium phthalate, tetramethylammonium maleate and tetramethylammonium succinate. The results are shown in FIG. 3 (solubility profile) and FIG. 4 (specific resistance profile).

Figure 3:
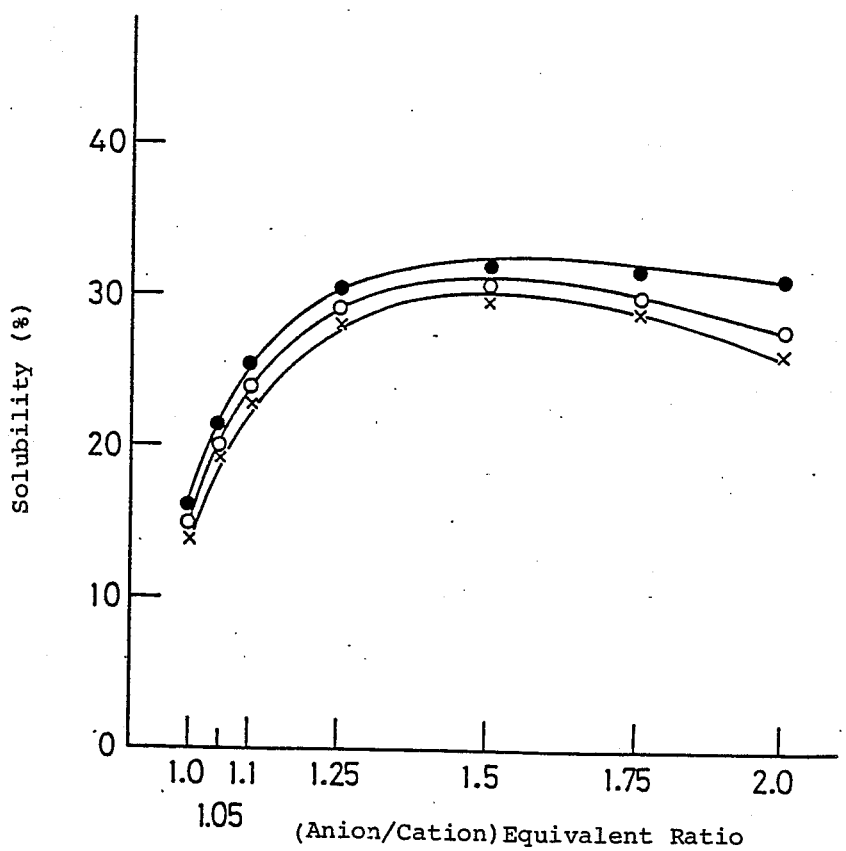
FIG. 3 is a graph showing the solubilities of various electrolytes in γ-butyrolactone as a function of the anion-to-cation molar ratio of the electrolytes.

As the graphs in FIGS. 1 and 3 show, the solubility of each of the electrolytes tested was low when anions and cations were present in equal amounts (the anion-to-cation ratio was unity), and it increased as the anion content increased. However, the solubility of each electrolyte peaked at an anion-to-cation molar ratio of about 1.5 and gradually decreased thereafter.

Figure 4:
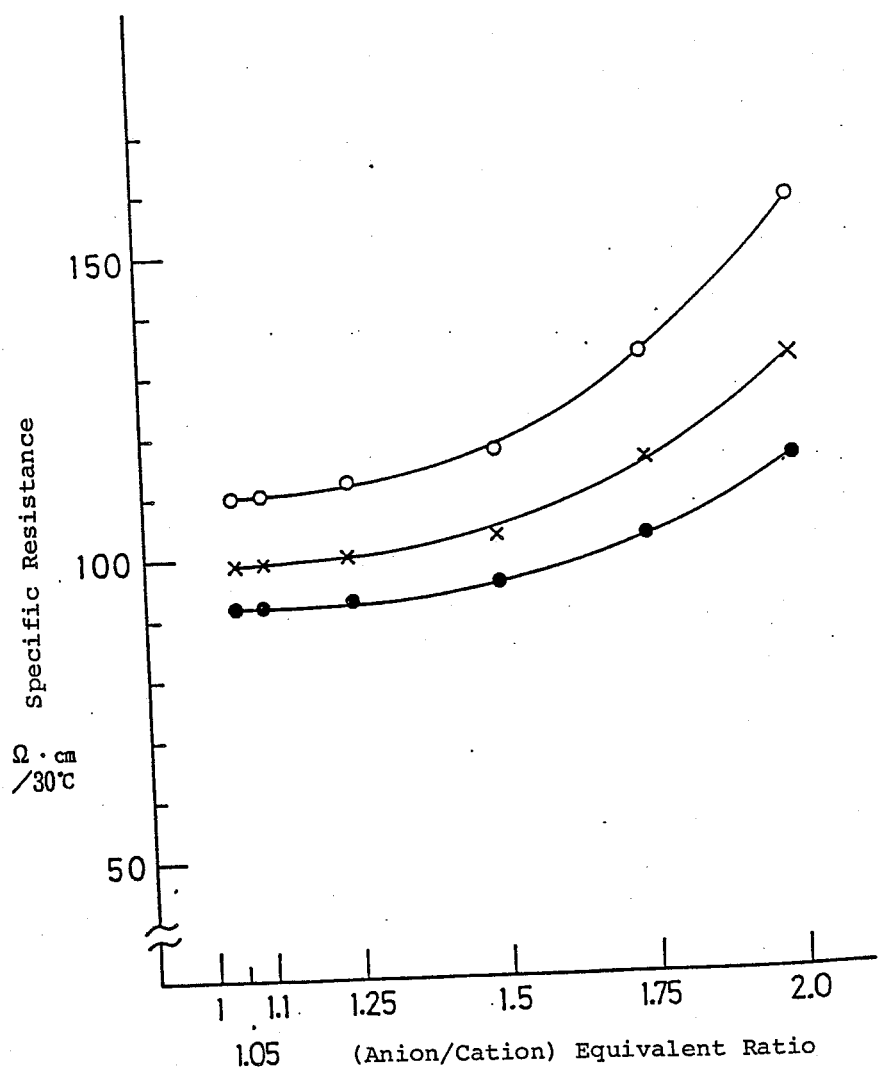
FIG. 4 is a graph showing the specific resistances of various electrolytes in γ-butyrolactone as a function of the anion-to-cation molar ratio of the electrolytes.

As the graphs in FIGS. 2 and 4 show, irrespective of the solvent used, the specific resistance of each of the liquid electrolytes under test had a tendency to increase with the anion-to-cation molar ratio of liquid electrolytes although the absolute value of specific resistance varied with the type of electrolyte used.

The above results show that a liquid electrolyte that complies with the objective of the present invention can be obtained by selecting an electrolyte whose anion-to-cation molar ratio is within such a range that it retains a high solubility in aprotic polar solvents while avoiding a pronounced increased in the specific resistance of the liquid electrolyte. Stated more specifically, no substantial improvement in solubility is attained if the anion-to-cation molar ratio of the electrolyte is less than 1.05. On the other hand, if the anion-to-cation molar ratio exceeds 1.75, not only is the specific resistance of the liquid electrolyte significantly increased but also the solubility of the electrolyte is decreased. Therefore, the preferred cation-to-anion molar ratio of the electrolyte is within the range of from 1:1.05 to 1:1.75.

In constructing the graphs shown in FIGS. 1 to 4, two solvents and three electrolytes were used. The present inventors also established that similar results were obtainable with other aprotic solvents and with electrolytes made of tetramethylammonium salts of other dicarboxylic acids.

In order to assess the practical feasibility of the present invention, the present inventors prepared samples of liquid electrolyte and examined their characteristics. Using these samples of liquid electrolyte, the present inventors also fabricated electrolytic capacitors and investigated their characteristics.

Table 1 given below shows the compositions of the liquid electrolytes prepared in Examples 1–6 (anion-to-cation molar ratio=1.25) and in Comparative Examples 1–6 (anion-to-cation molar ratio=1.0, as well as the specific resistances of these liquid electrolytes.

TABLE 1

| Sample of liquid electrolyte | Solvent | Electrolyte | Molar ratio | Concentration (wt %) | Specific resistance (Ω · cm/ 30° C.) |
|---|---|---|---|---|---|
| Comparative Example 1 | γ-butyrolactone | tetramethylammonium succinate | 1 | 10 | 131 |
| Example 1 | γ-butyrolactone | tetramethylammonium succinate | 1.25 | 25 | 94 |
| Comparative Example 2 | γ-butyrolactone | tetramethylammonium maleate | 1 | 10 | 105 |
| Example 2 | γ-butyrolactone | tetramethylammonium maleate | 1.25 | 25 | 77 |
| Comparative Example 3 | γ-butyrolactone | tetramethylammonium phthalate | 1 | 10 | 140 |
| Example 3 | γ-butyrolactone | tetramethylammonium phthalate | 1.25 | 25 | 103 |
| Comparative Example 4 | N,N-dimethylformamide | tetramethylammonium succinate | 1 | 10 | 81 |
| Example 4 | N,N-dimethylformamide | tetramethylammonium succinate | 1.25 | 25 | 57 |
| Comparative Example 5 | N,N-dimethylformamide | tetramethylammonium maleate | 1 | 10 | 70 |
| Example 5 | N,N-dimethylformamide | tetramethylammonium maleate | 1.25 | 25 | 53 |
| Comparative Example 6 | N,N-dimethylformamide | tetramethylammonium phthalate | 1 | 10 | 89 |
| Example 6 | N,N-dimethylformamide | tetramethylammonium phthalate | 1.25 | 25 | 64 |

When one compares an example of the present invention with a comparative example employing the same solvent and electrolyte, it can be seen that on account of the anion-to-cation molar ratio in excess of 1.0, the electrolyte used in the example of the present invention could be dissolved at a higher concentration (25 wt%) than the electrolyte used in the corresponding comparative example (10 wt%), thereby contributing to a lower specific resistance of the liquid electrolyte.

Electrolytic capacitors were fabricated using the liquid electrolytes under test. Each of the capacitors had a voltage rating of 16 V and a capacitance rating of 56 μF. The procedure of capacitor fabrication was as follows: an anode in the form a high-purity aluminum foil having a dielectric oxide film coating on its surface was rolled about itself together with a sheet of separator paper and a cathodic aluminum foil to form a cylindrical capacitor element; the capacitor element was impregnated with one of the liquid electrolytes shown in Table 1, and put into a metal case which was sealed with a rubber compound.

Each of the electrolytic capacitors so fabricated was subjected to measurements of capacitance, the tangent of dielectric loss angle (tan δ), leakage current, and the equivalent series resistance (ESR) at 100 kHz. The results are shown in Table 2 as the mean average of 10 capacitors.

TABLE 2

| Sample of liquid electrolyte | Capacitance (μF) | Dielectric loss tangent | Two-minute value of leakage current (μA) | ESR at 100 kHz (Ω) |
| --- | --- | --- | --- | --- |
| Comparative Example 1 | 64.2 | 0.103 | 0.25 | 0.84 |
| Example 1 | 64.8 | 0.077 | 0.21 | 0.57 |
| Comparative Example 2 | 64.7 | 0.085 | 0.23 | 0.65 |
| Example 2 | 65.4 | 0.065 | 0.20 | 0.45 |
| Comparative Example 3 | 64.0 | 0.109 | 0.27 | 0.90 |
| Example 3 | 64.7 | 0.083 | 0.23 | 0.63 |
| Comparative Example 4 | 65.0 | 0.068 | 0.24 | 0.47 |
| Example 4 | 65.3 | 0.052 | 0.22 | 0.30 |
| Comparative Example 5 | 65.2 | 0.060 | 0.21 | 0.39 |
| Example 5 | 65.4 | 0.049 | 0.19 | 0.28 |
| Comparative Example 6 | 65.0 | 0.074 | 0.25 | 0.54 |
| Example 6 | 65.2 | 0.056 | 0.20 | 0.35 |

When one compares any of the examples with the corresponding comparative example, one will be able to see that the characteristics obtained in the examples of the present invention were superior to those achieved in the comparative examples in terms of capacitance, dielectric loss tangent, leakage current and equivalent series resistance.

As discussed on the foregoing pages, the liquid electrolyte of the present invention allows the electrolyte (i.e., a tetraalkylammonium salt of a dicarboxylic acid) to be dissolved in aprotic polar solvents at a higher concentration than has been possible in the prior art. This contributes to a reduction in the specific resistance of the liquid electrolyte, and hence, low loss and equivalent series resistance characteristics can be attained. The increased solubility of the electrolyte also leads to improved efficency of electrochemical conversion, which is effective not only in reducing the leakage current but also in expanding the range of application temperatures, notably toward the lower temperature side. Because of these advantages, the liquid electrolyte of the present invention is suitable for use in an electrolytic capacitor that requires not only good electrical characteristics but also a broad range of operating environments.

While the invention has been described in detail and with reference to specific embodiments thereof, it will be apparent to one skilled in the art that various changes and modifications can be made therein without departing from the spirit and scope thereof.

What is claimed is:

1. A liquid electrolyte capacitor which contains as an electrolyte a dicarboxylic acid salt of tetramethylammonium in an aprotic polar solvent, with the molar ratio of cations to anions in the electrolyte being adjusted to be within the range of from 1:1.05 to 1:1.40.

2. A liquid electrolyte capacitor as in claim 1, wherein said dicarboxylic acid salt of tetramethylammonium is present in said liquid electrolyte capacitor in an amount of from 5 wt% to an amount sufficient to show a saturated solubility.

3. A liquid electrolyte capacitor as in claim 2, wherein said amount is from 10 wt% to 30 wt% based on the weight of the liquid electrolyte capacitor.

4. A liquid electrolyte capacitor as in claim 1, wherein said carboxylic acid forming a salt with tetramethylammonium is selected from the group consisting of oxalic acid, malonic acid, succinic acid, glutaric acid, adipic acid, pimelic acid, suberic acid, azelaic acid, sebacic acid, maleic acid, fumaric acid, methylmaleic acid and phthalic acid.

* * * * *

UNITED STATES PATENT AND TRADEMARK OFFICE
CERTIFICATE OF CORRECTION

PATENT NO.  : 4,915,861
DATED       : April 10, 1990
INVENTOR(S) : Yutaka YOKOYAMA ET AL It is certified that error appears in the above-identified patent and that said Letters Patent is hereby corrected as shown below:

IN THE DRAWINGS: In each of Figures 1-4, under the horizontal axis of the graphs shown therein, change "EQUIVALENT" to --MOLAR--.

Signed and Sealed this

Twenty-fifth Day of June, 1991

Attest:

HARRY F. MANBECK, JR.

*Attesting Officer*  *Commissioner of Patents and Trademarks*